(12) United States Patent
Dall et al.

(10) Patent No.: US 10,783,093 B2
(45) Date of Patent: Sep. 22, 2020

(54) DRIVER-TO-DRIVER COMMUNICATION

(71) Applicant: Hewlett Packard Enterprise Development LP, Houston, TX (US)

(72) Inventors: Elizabeth J. Dall, Fort Collins, CO (US); James M. Hull, Saratoga, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/251,226

(22) Filed: Jan. 18, 2019

(65) Prior Publication Data
US 2020/0233817 A1  Jul. 23, 2020

(51) Int. Cl.
*G06F 13/10* (2006.01)
*G06F 13/42* (2006.01)
*G06F 9/54* (2006.01)
*H04L 12/933* (2013.01)

(52) U.S. Cl.
CPC ............ *G06F 13/102* (2013.01); *G06F 9/546* (2013.01); *G06F 13/4221* (2013.01); *H04L 49/102* (2013.01)

(58) Field of Classification Search
None
See application file for complete search history.

(56) References Cited

U.S. PATENT DOCUMENTS

| | | | |
|---|---|---|---|
| 9,237,126 B2 | 1/2016 | McEvoy | |
| 9,680,770 B2 | 6/2017 | Davis | |
| 2009/0187284 A1* | 7/2009 | Kreiss | G06Q 50/06 700/291 |
| 2013/0132607 A1 | 5/2013 | Sinha | |
| 2019/0042483 A1* | 2/2019 | Abramson | G06F 9/5044 |
| 2019/0243700 A1* | 8/2019 | Brewer | G11C 7/1045 |

OTHER PUBLICATIONS

"Beyond IRPs: Driver to Driver Communications," Oct. 31, 2012, The NT Insider, <http://www.osronline.com/article.cfm?id=177 >.
"Connecting the Cisco UCS Fabric Interconnect." 2017 <ttps://www.cisco.com/c/en/us/td/docs/unified_computing/ ucs/hw/6454-install-guide/6454/6454_chapter_011.pdf> https://www.cisco.com/client/su/td/cocs/unified_computing/ucs/ hw/6300-install-guide/6300_Series_HIG/6300_Series_HIG_chapter_011.PDF.
"Messaging Overview," 2016, Gen-Z Consortium, <https://genzconsortium.org/wp-content/uploads/2018/05/20170303_Gen-Z-Messaging-Overview.pdf>-To the Right is Overview.pdf>.

* cited by examiner

*Primary Examiner* — Craig C Dorais
(74) *Attorney, Agent, or Firm* — Brooks, Cameron & Huebsch, PLLC

(57) ABSTRACT

An example system for driver-to-driver communication can include a first driver located on a first network device and including a transmit data mover (XDM) to send a preformatted message over a fabric interconnect to a second driver located on a second network device. The example system can also include the second driver located on the second network device and including a receive data mover (RDM) to receive the preformatted message, generate an interrupt responsive to receipt of the preformatted message, and route the interrupt to the second driver. The second driver can read the preformatted message responsive to receipt of the interrupt.

18 Claims, 5 Drawing Sheets

332

SENDING, VIA A TRANSMIT DATA MOVER (XDM), A PREFORMATTED MESSAGE OVER A FABRIC INTERCONNECT FROM A FIRST DRIVER LOCATED ON A FIRST NETWORK DEVICE DIRECTLY TO A RECEIVE DATA MOVER (RDM) OF A SECOND DRIVER LOCATED ON A SECOND NETWORK DEVICE

Fig. 3

DRIVER-TO-DRIVER COMMUNICATION

BACKGROUND

Fabric computing is a system that consists of connected storage, networking, and parallel processing functions interlinked with each other through high-bandwidth connections. Components of fabric computing can include nodes (e.g., processors, memory, peripherals, etc.) and links (e.g., functional connections between nodes).

BRIEF DESCRIPTION OF THE DRAWINGS

FIG. 3 illustrates an example method for driver-to-driver communication consistent with the disclosure.

DETAILED DESCRIPTION

Figure 1:
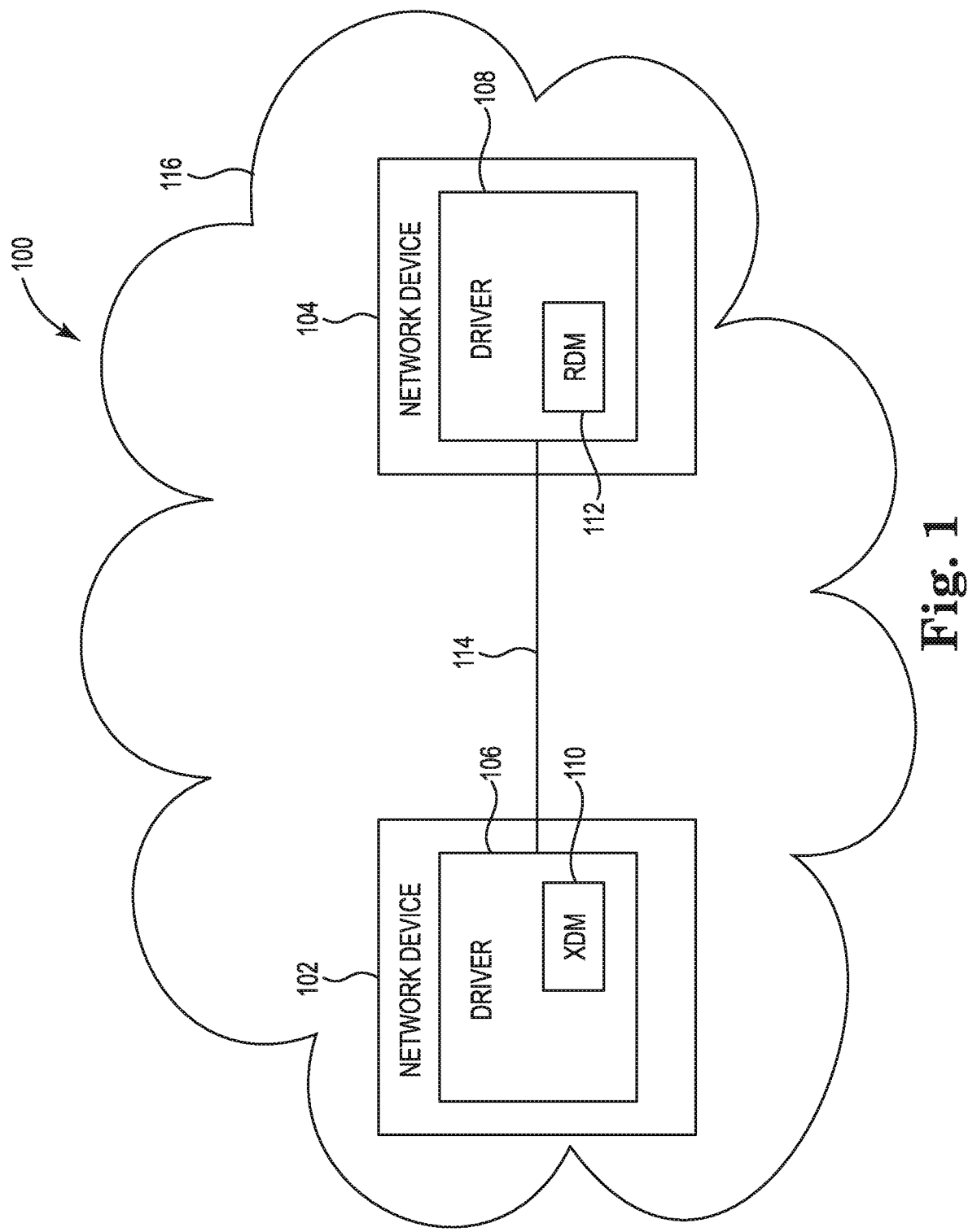
FIG. 1 illustrates an example system including a first and a second driver consistent with the disclosure.

A driver (also known as a device driver) is a program that operates or controls a particular type of device. A driver provides an interface (e.g., a software interface) to hardware devices, enabling operating systems (OSs) and other computer programs to access hardware functions without needing to know precise details about the hardware being used. A driver communicates with the device through a bus or communications subsystem to which the hardware connects. When a calling program invokes a routine in the driver, the driver issues commands to the device. Once the device sends data back to the driver, the driver may invoke routines in the original calling program. A driver may be hardware-dependent and operating-system-specific.

Device drivers may not be able to communicate with one another, particularly if the device drivers are on different systems and/or run on different OSs. Some approaches to device driver communication include the use of Ethernet for communication. However, Ethernet connections may not be available for some types of interconnects, such as a Gen-Z fabric interconnect. Ethernet connections may also include intermediates between drivers, for instance, Ethernet connections may include going through applications in user space for communication between drivers. In addition, Ethernet connections can make region keys (R-keys) associated with a Gen-Z fabric interconnect visible to user space applications, which can reduce security, and/or Ethernet connections may be vulnerable to snooping.

In contrast, examples of the present disclosure provide for direct driver-to-driver communication. As used herein, direct driver-to-driver communication includes communication without intervening factors or intermediaries. For instance, communication is sent from a first driver to a second driver over a fabric interconnect without intervening factors or intermediaries, such as applications. For instance, some examples of the present disclosure can allow for a driver for a bridge that works on Gen-Z fabric interconnect to facilitate direct driver-to-driver communication. The drivers can be on different devices (e.g., network devices) and/or can run on different OSs.

Some examples of the present disclosure utilize a preformatted message sent via a receive data mover (RDM)/transmit data mover (XDM) pair. This preformatted message allows for overcoming hardware limitations as compared to approaches that use a remote procedure call (RPC) mechanism. For instance, the hardware for the XDM may be limited to a small packet that precludes using an RPC mechanism.

Direct driver-to-driver communication can allow for status determinations of network devices that may be sharing resources. For instance, if a first network device is sharing resources with a second network device, and the application using the second network device fails (e.g., crashes), a driver of the second network device can communicate this directly to a driver of the first network device. Resources can be cleaned and released by the network device that owns the resources. Direct driver-to-driver communication allows for expediated communication, and may result in fewer errors, as intermediaries during communication may be reduced or eliminated. This can also result in improved performance of the network devices, as they are not sharing resources with failing applications.

The figures herein follow a numbering convention in which the first digit corresponds to the drawing figure number and the remaining digits identify an element or component in the drawing. For example, reference numeral 106 refers to element "06" in FIG. 1 and an analogous element may be identified by reference numeral 506 in FIG. 5. Analogous elements within a Figure may be referenced with a hyphen and extra numeral or letter. See, for example, elements 534-1 and 534-n in FIG. 2. Such analogous elements may be generally referenced without the hyphen and extra numeral or letter. For example, elements 534-1 and 534-n may be collectively referenced as 534. Elements shown in the various figures herein can be added, exchanged, and/or eliminated so as to provide a number of additional examples of the disclosure. In addition, the proportion and the relative scale of the elements provided in the figures are intended to illustrate the examples of the disclosure and should not be taken in a limiting sense.

FIG. 1 illustrates an example system 100 including a first driver 106 and a second driver 108 consistent with the disclosure. Driver 106 is located on a first network device 102, and driver 108 is located on a second network device 104. As used herein, a network device may include a computing device that is communicatively coupled or capable of being communicatively coupled to a computing network, such as network 116. For example, a network device may include a computer, a network controller, an access point, a data transfer device, etc. Network 116 can include, for instance an SD-WAN, a LAN, a WLAN, a VPN, the Internet, or the like, or a combination thereof. While two network devices 102, 104 and two drivers 106, 108 are illustrated in FIG. 1, more or fewer network devices and/or drivers may be present in network 116. While illustrated on the same network 116 in FIG. 1, network devices 102, 104 and drivers 106, 108 may be located on different networks. Additionally or alternatively, drivers 106 and 108 may be running on different OSs.

Driver 106 can be communicatively coupled to XDM 110 and driver 108 can be communicatively coupled to RDM 112. As used herein, "communicatively coupled" can include coupled via various wired and/or wireless connections between devices such that data can be transferred in various directions between the devices. The coupling need not be a direct connection, and in some examples, can be an indirect connection. For instance, XDM 110 and RDM 112 may be hardware located on a fabric interconnect 114 connecting drivers 106 and 108. XDM 110 and RDM 112, in some examples, may facilitate commands directing network devices 102 and 104, respectively, to perform a specific task. Data movers, such as XDM 110 and RDM 112, are devices that move (e.g., transmit and receive) data between devices such as storage area network (SAN) devices. Data movers, such as XDM 110 and RDM 112, may be components that run on their own OSs, in some examples.

In some examples, XDM 110 can send a preformatted message over fabric interconnect 114 to driver 108, and RDM 112 can receive the preformatted message. As used herein, a preformatted message is a data structure in which two drivers agree to communicate information. For example, a data structure that has an operation code as the first byte can be parsed by the receiving device driver so that the remaining bytes have an agreed upon format. The message is preformatted such that it can be communicated directly over a particular fabric interconnect. The message is preformatted to be compatible with the fabric interconnect and receivable by the second driver.

A fabric interconnect, as used herein, allows for network devices to communicate across various busses and other connections. For example, a fabric interconnect can include a computing fabric consisting of interconnected nodes such as the aforementioned busses and other connections. In some examples, fabric interconnect 114 can include a Gen-Z fabric interconnect. The Gen-Z fabric interconnect is an open systems interconnect designed to provide memory-semantic access to data and devices via direct-attached, switched, or fabric topologies.

Responsive to the receipt of the preformatted message, RDM 112 can generate an interrupt, and the interrupt can be routed to driver 108. In some examples an interrupt handler can be located on driver 108 for handling of the interrupt locally (e.g., not on user space) and delivering the interrupt for decoding. Driver 108 can read the preformatted message responsive to receipt of the interrupt. The preformatted message, in some instances, can be read out of a memory of network device 104 to which RDM 112 has deposited the preformatted message. Content of the preformatted message can include information regarding a failing (e.g., crashing) network device, and information regarding resources associated with network devices that need cleaning, among others.

In some examples, driver 106 can include and/or be communicatively coupled to an RDM different from RDM 112 that can receive a different preformatted message from driver 108. For instance, driver 108 can include and/or be communicatively coupled to an XDM different from XDM 110 that can send the different preformatted message to driver 106. For instance, a response from driver 108 can be sent to the different RDM from the different XDM or a new preformatted message can be sent.

XDM 110 can be part of a queue pair with an RDM communicatively coupled to driver 106 and RDM 112 can be part of a queue pair with an XDM communicatively coupled to driver 108. Transmit and receive data movers (e.g., XDM 110 and RDM 112) are created in pairs, with each pair referred to as a queue pair. For instance, drivers 106, 108 can allocate these respective queue pairs for direct driver-to-driver communication. When a preformatted message is provided to XDM 110, it is told where to send it, and when it is received at RDM 112, driver 108 can read the preformatted message out of the queue and read (e.g., decode) it according to structure definitions. The driver can determine parameters, code, resources, issues, or type of message (e.g., import message, free message, etc.), among other characteristics associated with the preformatted message.

Figure 2:
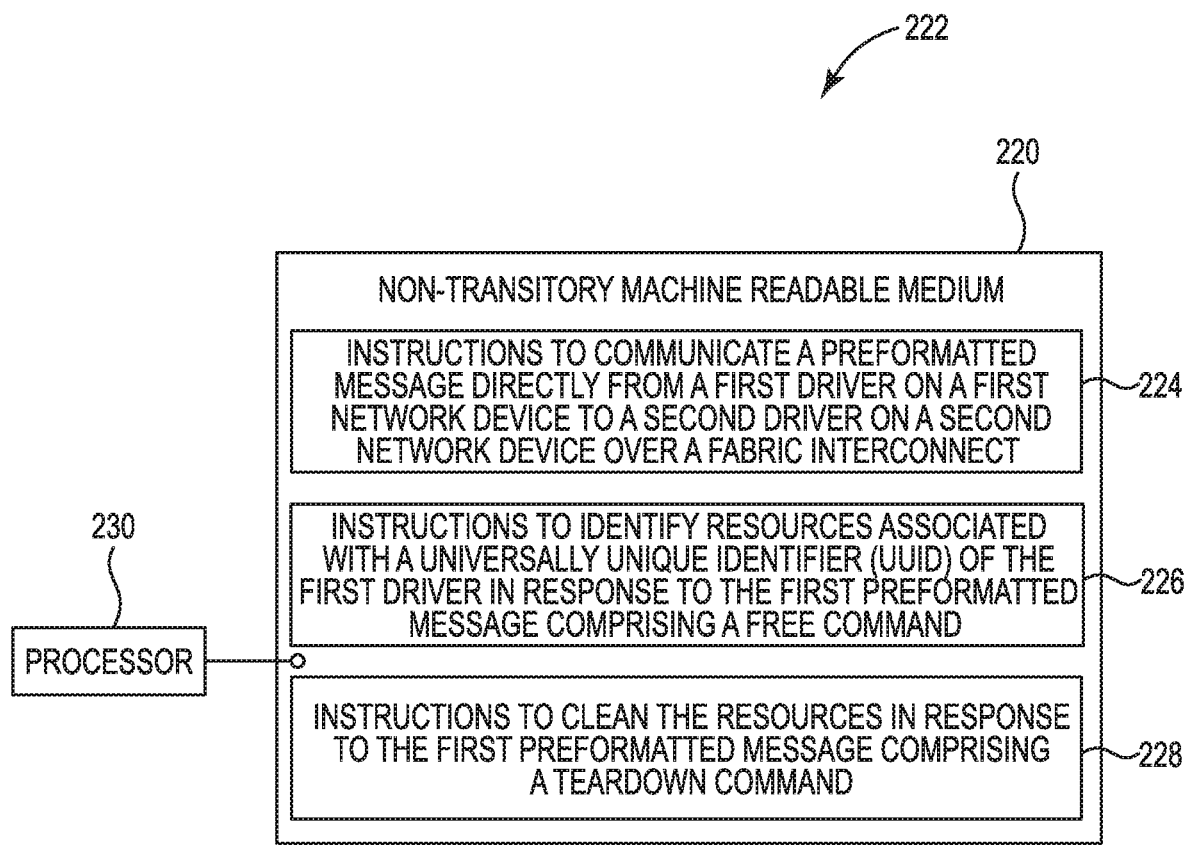
FIG. 2 illustrates a system for driver-to-driver communication consistent with the disclosure.

FIG. 2 illustrates a system 222 for driver-to-driver communication consistent with the disclosure. System 222 can be a computing device in some examples and can include a processor 230. System 222 can further include a non-transitory machine-readable medium (MRM) 220, on which may be stored instructions, such as instructions 224, 226, and 228. In some instance, MRM 220 is a bridge device driver. For instance, a bridge device driver facilitates direct driver-to-driver communication by allowing a message to be sent from a native processor (e.g., associated with a first driver on a first network device) across a particular fabric interconnect (e.g., Gen-Z) to a second driver on a second network device.

Although the following descriptions refer to a processor and a memory resource, the descriptions may also apply to a system with multiple processors and multiple memory resources. In such examples, the instructions may be distributed (e.g., stored) across multiple non-transitory MRMs and the instructions may be distributed (e.g., executed by) across multiple processors.

Non-transitory MRM 220 may be electronic, magnetic, optical, or other physical storage device that stores executable instructions. Thus, non-transitory MRM 220 may be, for example, Random Access Memory (RAM), an Electrically-Erasable Programmable ROM (EEPROM), a storage drive, an optical disc, and the like non-transitory MRM 220 may be disposed within system 222, as shown in FIG. 2. In this example, the executable instructions 224, 226, and 228 can be "installed" on the device. Additionally and/or alternatively, non-transitory MRM 220 can be a portable, external or remote storage medium, for example, that allows system 222 to download the instructions 224, 226, and 228 from the portable/external/remote storage medium. In this situation, the executable instructions may be part of an "installation package". As described herein, non-transitory MRM 220 can be encoded with executable instructions for driver-to-driver communication.

Instructions 224, when executed by a processor such as processor 230, can include instructions to communicate a preformatted message directly from a first driver on a first network device to a second driver on a second network device over a fabric interconnect. For instance, the preformatted message can be communicated without intervening factors or intermediaries. As noted above with respect to FIG. 1, in some examples, the preformatted message can be communicated via a first XDM/RDM queue pair of the first driver and a second XDM/RDM queue pair of the second driver.

Instructions 226, when executed by a processor such as processor 230, can include instructions to identify resources associated with a universally unique identifier (UUID) of the first driver in response to the first preformatted message comprising a free command. The UUID, as used herein, is a number used to identify information associated with the first driver. Resources can include, for instance, memory resources, communication resources, etc. These resources may be shared among network devices. For instance, memory resources on a first network device can be accessed across a fabric interconnect by the second network device (e.g., via the first and the second drivers). The memory resources can be directly mapped into an application that is running on the second network device. However, if something happens to the application, it fails, and it cannot clean itself up, the first driver can clean it and release the resources.

The preformatted message can include information to clean and teardown the communication. A "free" command is associated with clean resources/applications/network devices. Thus, a free command can allow for identification of the resources and sharing of the resources. In contrast, a "teardown" command indicates resources/applications/network devices should be cleaned. For instance, instructions 228, when executed by a processor such as processor 230, can include instructions to clean the resources in response to the first preformatted message comprising a teardown command. When a network device fails, preformatted messages can indicate this, the UUID can be torn down, and action can be taken to clean and release resources, so they can be shared with and/or used by other network devices.

FIG. 3 illustrates an example method 332 for driver-to-driver communication consistent with the disclosure. Method 332, in some instances, can be performed using a bridge device driver. Method 332 can include sending, via an XDM, a preformatted message over a Gen-Z fabric interconnect from a first driver located on a first network device directly to an RDM of a second driver located on a second network device. The preformatted message is communicated directly such that it goes from the first driver to the second driver without intervention (e.g., without going into user space). In some examples, a different preformatted message (e.g., a response) can be sent via an XDM of the second driver over the Gen-Z fabric interconnect from the second driver directly to an RDM of the first driver.

For instance, a UUID associated with the first driver can be imported to the network device and/or the driver. The UUID can identify information associated with the first driver and can be associated with resources of the first driver (e.g., memory resources, communication resources, etc.) In some examples, resources associated with the UUID can be torn down responsive to an unexpected event occurring at the first network device or a different network device (e.g., the second network device or a third network device in direct communication with the first driver). As used herein, a teardown can include tracking communications and network devices to determine which network devices and/or drivers are using which resources on the network. A teardown can also include determining how to clean a communication or resource.

For instance, a preformatted message to or from the second driver may reveal that the first network device has failed. In response, a resource such as a memory resource that the first driver was sharing with a different network device can be torn down and cleaned. Similar, resources that were shared with the first network device (that has since failed) can be torn down and cleaned. Once cleaned, resources can be released for sharing with other drivers. For instance, the resources associated with the UUID can be released to a third driver on a third network device responsive to completion of the teardown. Put another way, resources can be shared between the first driver and the second driver via the fabric interconnect, and resource sharing can be ceased responsive to failure of an application using the shared resources on one of the first or the second network devices.

In some examples, method 332 can include transmitting R-keys to the RDM for access control. For instance, when a preformatted message is communication, R-keys can be used to provide page-level access control, for instance what a particular process can see or cannot see of the preformatted message. In some examples, the R-keys do not enter user space, but remain at the kernel level so as to reduce exposure to a malicious agent (e.g., isolate malicious agents). The R-keys can also be used to determine how to clean up if a process on a different network device fails. For instance, R-keys can mitigate potential damage caused by erroneous or failing components.

Figure 4:
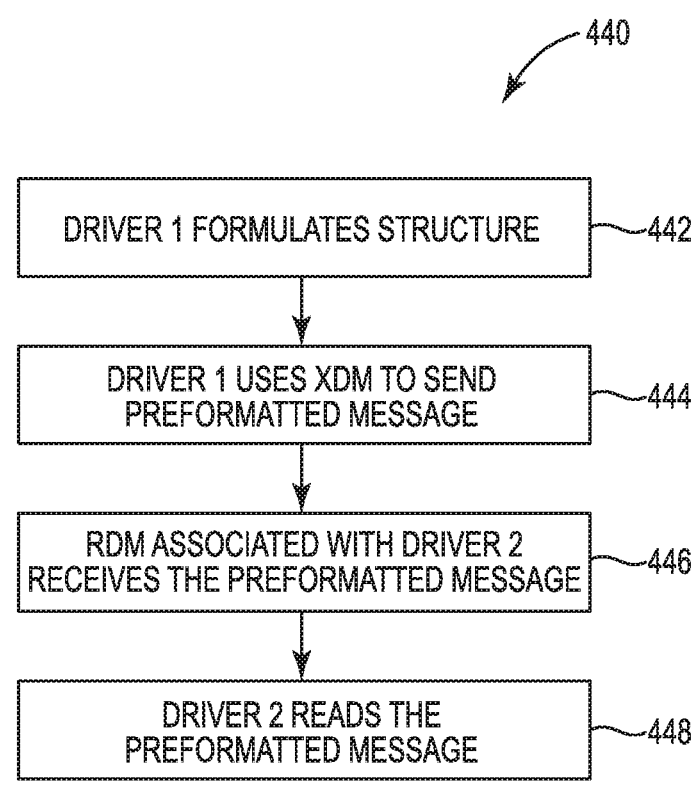
FIG. 4 illustrates an example flow diagram associated with driver-to-driver communication consistent with the disclosure

FIG. 4 illustrates an example flow diagram 440 associated with driver-to-driver communication consistent with the disclosure. At 442, a first driver ("Driver 1") formulates in memory of an associated network device a structure that looks like a UUID import request. Based on the apparent UUID import request, at 444, the first driver uses hardware, for instance an XDM, in a fabric interconnect (e.g., Gen-Z fabric interconnect) to send a preformatted message. For instance, the hardware allows sending the preformatted message out over a fabric interconnect to an intended destination.

Resources associated with the UUID of the first driver can be identified based on commands of the preformatted message (e.g., free command, teardown command, etc.). Resources can include, for instance, memory resources, communication resources, etc. These resources may be shared among network devices. For instance, memory resources on a first network device can be accessed across a fabric interconnect by the second network device (e.g., via the first and the second drivers). The memory resources can be directly mapped into an application that is running on the second network device. However, if something happens to the application, it fails, and it cannot clean itself up, the first driver can clean it and release the resources.

The preformatted message can include information to clean and teardown the communication. A "free" command is associated with clean resources/applications/network devices. Thus, a free command can allow for identification of the resources and sharing of the resources. In contrast, a "teardown" command indicates resources/applications/network devices should be cleaned. Thus, a teardown command can result in cleaning of the resources (e.g., responsive to identification of the resources). When a network device fails, preformatted messages can indicate driver issues, the UUID can be torn down, and action can be taken to clean and release resources, so they can be shared with and/or used by other network devices.

At 446, the preformatted message is received at hardware, for instance an RDM, of a second driver ("Driver 2") and it generates an interrupt, which is routed to the second driver. In some examples an interrupt handler can be located on the second driver for handling of the interrupt locally (e.g., not on user space) and delivering the interrupt for decoding.

At 448, the second driver reads the preformatted message out of memory on an associated network device to which the hardware has deposited the preformatted message. In some examples, the preformatted message is read by the second driver responsive to receipt of the interrupt. The preformatted message, in some instances, can be read out of a memory of a network device to which the RDM has deposited the preformatted message. Content of the preformatted message can include information regarding a failing (e.g., crashing) network device and information regarding resources associated with network devices that need cleaning, among other information.

The preformatted message can include a particular header block, so the driver can know by examining particular fields of the header block (e.g., an opcode field) what the preformatted message entails (e.g., an import command, a free command, etc.). This information can be used by a bridge device driver to determine how to teardown UUIDs and communications and determine whether processes associated with network devices should be cleaned.

Figure 5:
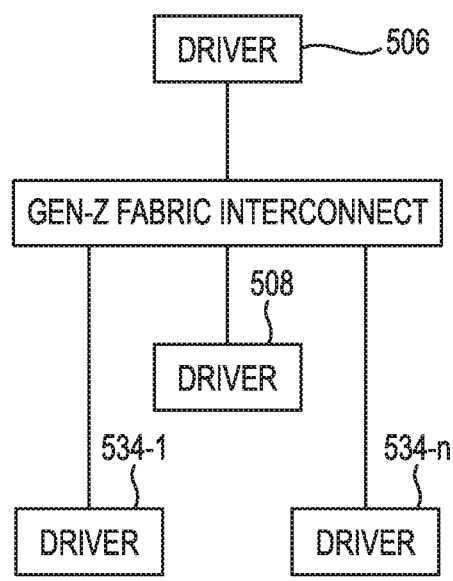
FIG. 5 illustrates another example system including a first and a second driver consistent with the disclosure.

FIG. 5 illustrates another example system including a first driver 506 and a second driver 508 consistent with the disclosure. The system in FIG. 5 illustrates that a plurality of drivers 506, 508, 534-1, . . . , 534-n can communicate with each other via a Gen-Z fabric interconnect. Drivers 506, 508, 534 can be located on their own respective network devices, and each one of drivers 506, 508, 534 has its own XDM/RDM queue pair associated therewith. Network devices associated with drivers 506, 508, 534 can share resources, and using preformatted messages communicated between drivers 506, 508, 534, teardown and cleaning determinations can be made as previously described herein.

For instance, driver 506 can be located on a first network device, and driver 108 can be located on a second network device. Drivers 534 can be located on the second network device, on a third network device, or may be on separate network devices. While four drivers are illustrated in FIG. 5, more or fewer network drivers may be present. Drivers 506, 508, and 534 may be on a same or different OSs in some examples.

In some examples, driver 506 can be communicatively coupled to and XDM of the Gen-Z fabric interconnect, and drivers 508 and 534 can be communicatively coupled to and RDM of the fabric interconnect. For instance, the XDM and the RDM may be hardware located on the fabric interconnect connecting drivers 506 and 508, and 534. In some examples, the XDM can send a preformatted message over the Gen-Z fabric interconnect to driver 508 or 534, and the RDM can receive the preformatted message.

As used herein, the designator "n", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

What is claimed is:

1. A method, comprising:
sending, via a transmit data mover (XDM), a preformatted message over a fabric interconnect from a first driver located on a first network device directly to a receive data mover (RDM) of a second driver located on a second network device;
importing a universal unique identifier (UUID) associated with the first driver; and
tearing down resources associated with the UUID responsive to an unexpected event occurring at the first network device.

2. The method of claim 1, further comprising transmitting region keys (R-keys) to the RDM for access control.

3. The method of claim 1, further comprising releasing, to a third driver on a third network device, the resources associated with the UUID responsive to completion of the teardown.

4. The method of claim 1, further comprising sharing resources between the first driver and the second driver via the fabric interconnect.

5. The method of claim 4, further comprising ceasing resource sharing responsive to failure of an application using the shared resources on one of the first network device or the second network devices.

6. The method of claim 1, further comprising sending the preformatted message over a Gen-Z fabric interconnect.

7. A non-transitory machine-readable medium having instructions that when executed by a processor cause the processor to:
communicate a preformatted message directly from a first driver on a first network device to a second driver on a second network device over a fabric interconnect;
identify resources associated with a universally unique identifier (UUID) of the first driver in response to the first preformatted message comprising a free command; and
clean the resources in response to the first preformatted message comprising a tear down command.

8. The medium of claim 7, wherein the medium comprises a bridge device driver.

9. The medium of claim 7, further comprising instructions executable to communicate the preformatted message via a first transmit data mover/receive data mover (XDM/RDM) queue pair of the first driver and a second XDM/RDM queue pair of the second driver.

10. The medium of claim 7, wherein the preformatted message comprises information to clean and teardown the communication.

11. The medium of claim 7, wherein the first and the second drivers run on different operating systems.

12. The medium of claim 7, wherein the instructions to communicate the preformatted message directly comprise instructions executable to communicate the preformatted message without intervening factors or intermediaries.

13. A system comprising:
at least one processor;
a non-transitory machine-readable medium having instructions that when executed by the at least one processor cause the at least one processor to:
communicate a preformatted message directly from a first driver on a first network device to a second driver on a second network device over a fabric interconnect;
identify resources associated with a universally unique identifier (UUID) of the first driver in response to the first preformatted message comprising a free command; and
clean the resources in response to the first preformatted message comprising a tear down command.

14. The system of claim 13, wherein the medium comprises a bridge device driver.

15. The system of claim 13, where the medium further comprising instructions executable to communicate the preformatted message via a first transmit data mover/receive data mover (XDM/RDM) queue pair of the first driver and a second XDM/RDM queue pair of the second driver.

16. The system of claim 13, wherein the preformatted message comprises information to clean and teardown the communication.

17. The medium of claim 13, wherein the first and the second drivers run on different operating systems.

18. The system of claim 13, wherein the instructions to communicate the preformatted message directly comprise instructions executable to communicate the preformatted message without intervening factors or intermediaries.

* * * * *